(12) United States Patent
Miyazawa

(10) Patent No.: US 10,873,701 B2
(45) Date of Patent: Dec. 22, 2020

(54) IMAGE PICKUP APPARATUS AND CONTROL METHOD THEREOF

(71) Applicant: CANON KABUSHIKI KAISHA, Tokyo (JP)

(72) Inventor: Hitoshi Miyazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/245,379

(22) Filed: Jan. 11, 2019

(65) Prior Publication Data

US 2019/0222764 A1 Jul. 18, 2019

(30) Foreign Application Priority Data

Jan. 15, 2018 (JP) ................. 2018-004221

(51) Int. Cl.
*H04N 5/232* (2006.01)
*H04N 5/235* (2006.01)
*G06T 5/00* (2006.01)

(52) U.S. Cl.
CPC ......... *H04N 5/23267* (2013.01); *G06T 5/003* (2013.01); *H04N 5/232* (2013.01); *H04N 5/2353* (2013.01); *H04N 5/23238* (2013.01); *H04N 5/23258* (2013.01); *H04N 5/23287* (2013.01)

(58) Field of Classification Search
CPC ........... H04N 5/23267; H04N 5/23258; H04N 5/23238; H04N 5/23287; H04N 5/232; H04N 5/2353; G06T 5/003; G06T 2200/32; G06T 2207/20221; G06T 5/50
See application file for complete search history.

(56) References Cited

U.S. PATENT DOCUMENTS

| 8,917,313 B2 | 12/2014 | Shimada | |
| 2016/0044245 A1* | 2/2016 | Tsubaki | H04N 5/23258 348/208.11 |

FOREIGN PATENT DOCUMENTS

JP 2011-147094 A 7/2011

* cited by examiner

*Primary Examiner* — Yogesh K Aggarwal
(74) *Attorney, Agent, or Firm* — Cowan, Liebowitz & Latman, P.C.

(57) ABSTRACT

An image pickup apparatus capable of compositing a plurality of continuously captured images is provided that includes a first detection unit configured to detect shake of the image pickup apparatus; a second detection unit configured to detect a moving amount of a captured image captured by an imaging unit; a correction unit configured to correct image blur of an image caused by shake of the image pickup apparatus; a control unit configured to calculate a blur amount of a background in the captured image from a shake detection signal detected by the first detection unit and the moving amount detected by the second detection unit and to control image blur correction performed by the correction unit; and a combining unit configured to combine a plurality of captured images with corrected image blur.

12 Claims, 10 Drawing Sheets

IMAGE PICKUP APPARATUS AND CONTROL METHOD THEREOF

BACKGROUND OF THE INVENTION

Field of the Invention

The present invention relates to a technique of correcting image blur of a captured image.

Description of the Related Art

In panorama photography, a process of capturing a plurality of unit images while changing photographing directions is performed and a process of cutting out image regions having a predetermined size which constitute parts of the captured unit images such that overlap regions are generated is executed. The cut-out image regions are sequentially superimposed to generate one image (hereinafter referred to as a panorama photography).

The following two points are important in order to photograph panorama photography well. The first point is to determine correct compositing positions when a plurality of images are composited after capturing. The second point is to accurately correct background blur such that background blur in captured images for compositing (hereinafter referred to as background blur) does not occur. Even when a plurality of images have been correctly composited, if background blur remains in each image, the composited images fail as a panorama photography. Japanese Patent Laid-Open No. 2011-147094 discloses a technology for correcting blur occurring due to movement of an image pickup apparatus when a plurality of images for generating a panorama photography are acquired.

In correction of background blur in panorama photography, it is necessary to accurately detect background blur as angular velocities. An image without background blur can be photographed by integrating detected background angular velocities and driving an image blur correction unit according to a shift lens, an imaging element and the like.

In the apparatus disclosed in Japanese Patent Laid-Open No. 2011-147094, there is a possibility that background blur cannot be accurately corrected. If background blur is detected using a gyro sensor, an accurate blur amount may not be obtained because the output of the gyro sensor has a low-frequency noise component. Further, there are driving mechanisms such as a movable mirror and a mechanical shutter in a camera main body. If a driving mechanism operates and thus shake thereof is detected, there is a possibility of mis-detection of a blur amount. In such a case, when incorrect background angular velocity detection values are used for image blur correction control, so-called background blur remnant may be generated.

SUMMARY OF THE INVENTION

An object of the present invention is to improve image quality of an image obtained by compositing a plurality of captured images by detecting background blur in continuous imaging and performing image blur correction.

An apparatus of an embodiment of the present invention is an image pickup apparatus capable of combining a plurality of continuously captured images, comprising: at least one processor and at least one memory functioning as: a first detection unit configured to detect shake of the image pickup apparatus; a second detection unit configured to detect a moving amount of a captured image captured by an imaging unit; a correction unit configured to correct image blur of an image caused by shake of the image pickup apparatus; a control unit configured to calculate a blur amount of a background in the captured image from a shake detection signal detected by the first detection unit and the moving amount detected by the second detection unit and to control image blur correction performed by the correction unit; and a combining unit configured to combine a plurality of captured images with corrected image blur.

According to the present invention, it is possible to improve image quality of an image obtained by compositing a plurality of captured images by detecting background blur in continuous imaging and performing image blur correction.

Further features of the present invention will become apparent from the following description of exemplary embodiments (with reference to the attached drawings).

DESCRIPTION OF THE EMBODIMENTS

Hereinafter, embodiments of the present invention will be described in detail on the basis of the attached drawings. Although an image pickup apparatus is described using a single lens reflex camera in each embodiment, the present invention is applicable to various electronic apparatuses having an imaging unit such as a mirrorless camera and a compact digital camera. Panorama photography will be described as an example of generating image data by compositing captured image data acquired through continuous imaging.

First Embodiment

Figure 1:
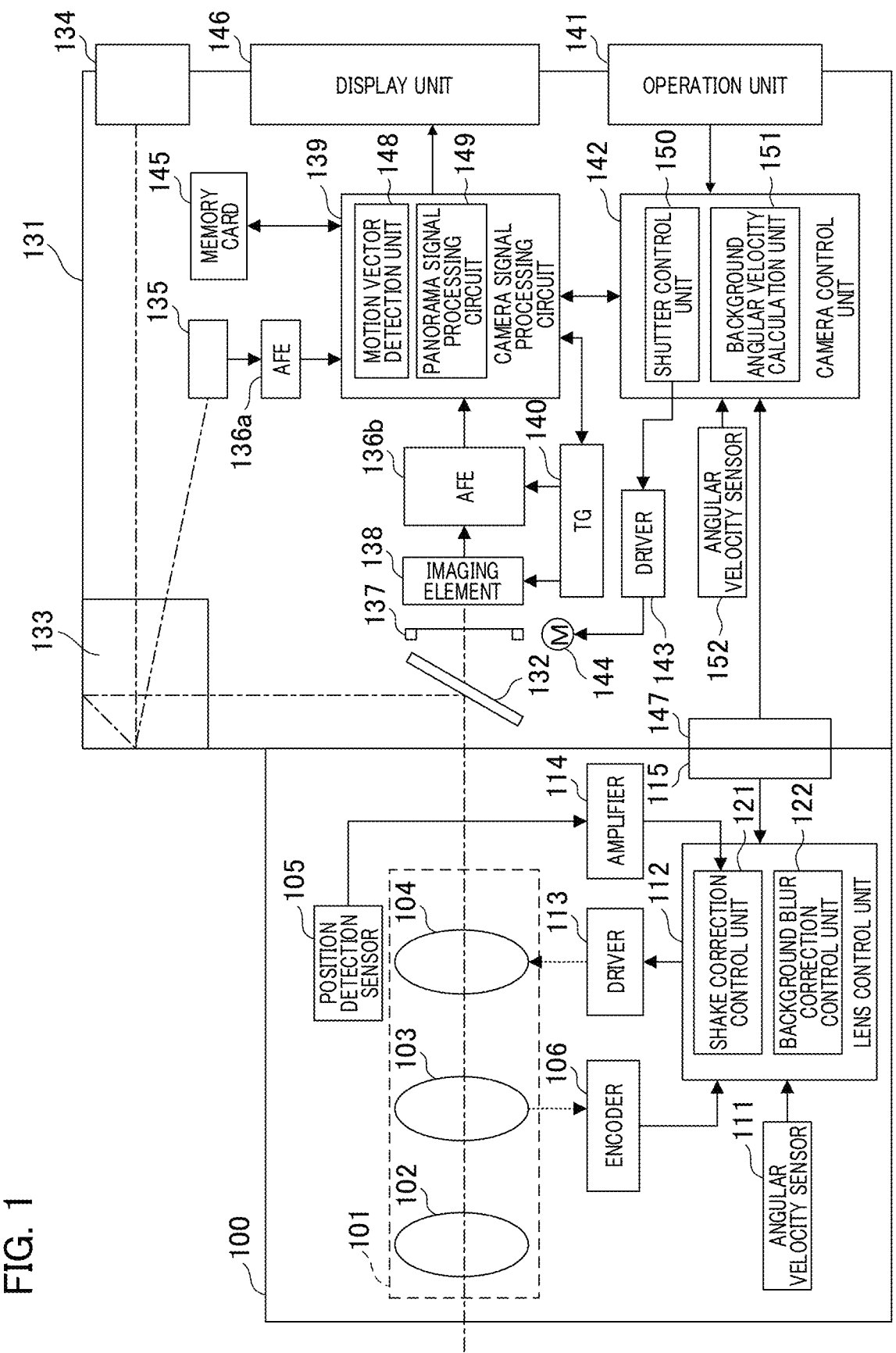
FIG. 1 is a diagram illustrating a configuration of an image pickup apparatus according to an embodiment of the present invention.
Figure 2:
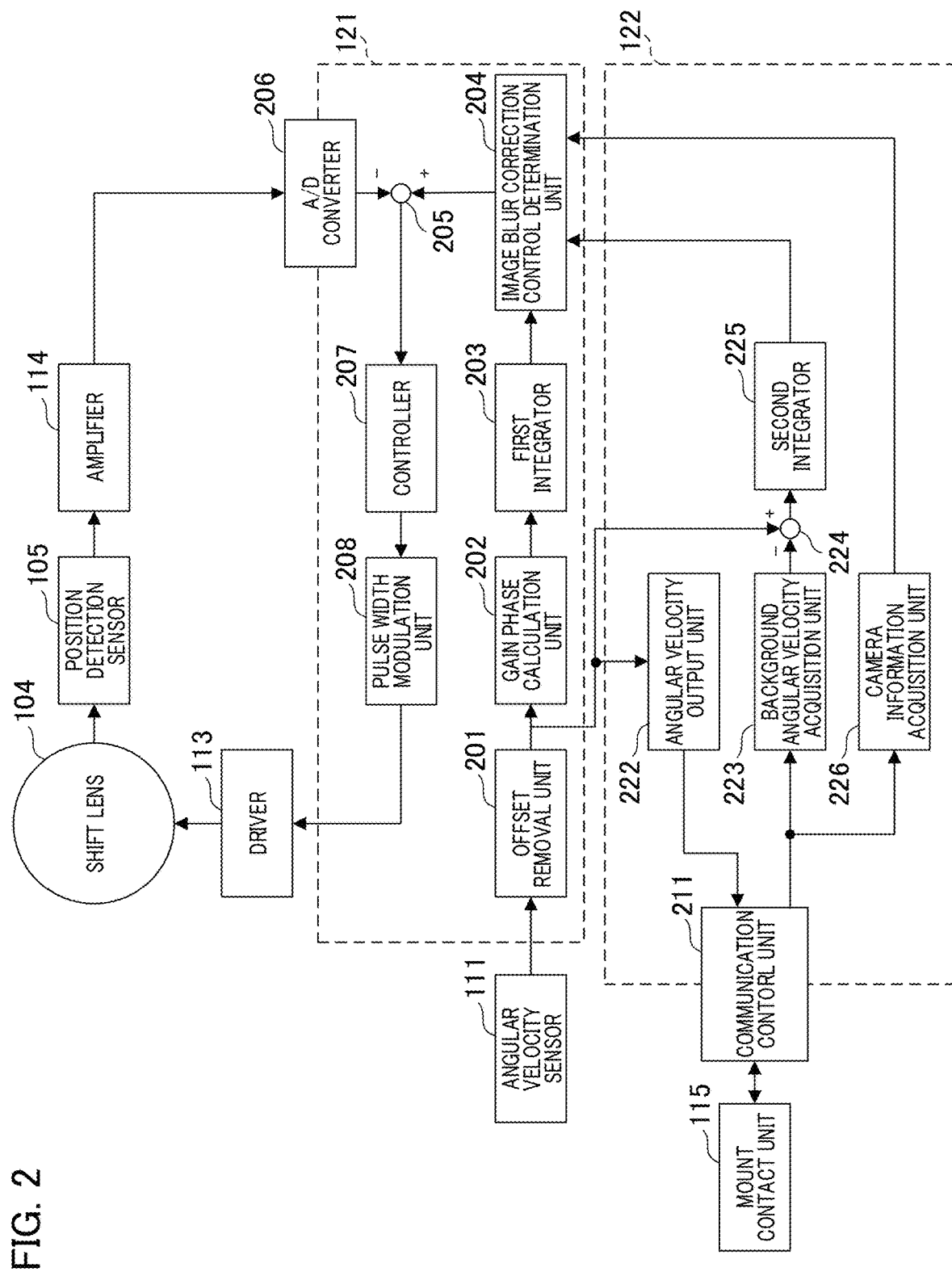
FIG. 2 is a block diagram describing control of image blur correction in an embodiment of the present invention.
Figure 3A:
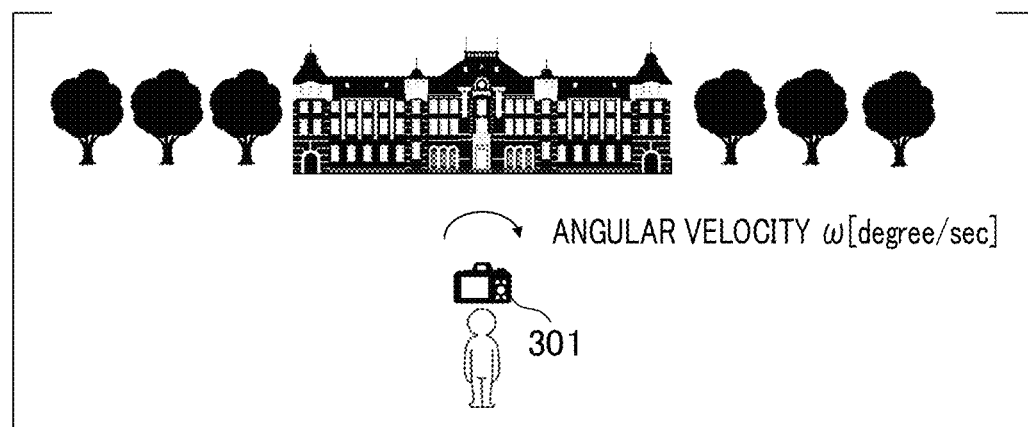
FIGS. 3A to 3C are conceptual diagrams describing panorama photography compositing.
Figure 3B:
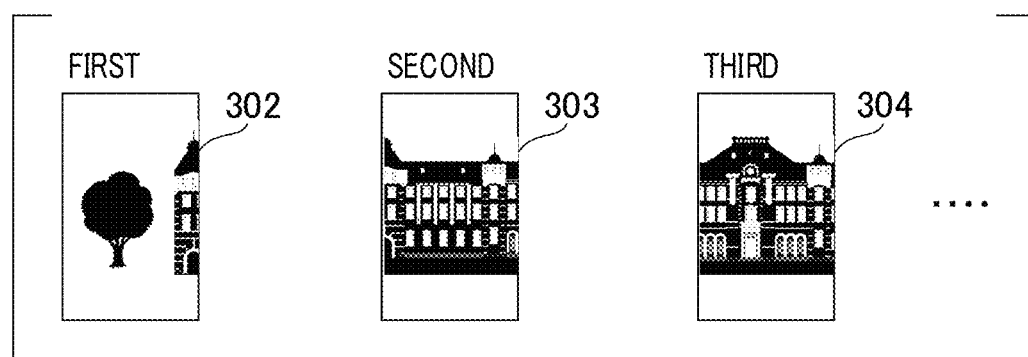
Figure 3C:
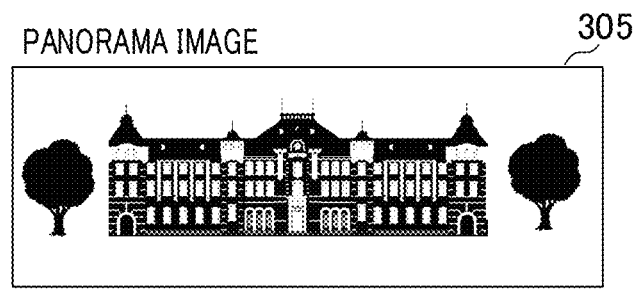

FIG. 1 is a block diagram showing an example of a configuration of an image pickup apparatus of the present embodiment. FIG. 2 is a block diagram for describing image blur correction control of the present embodiment. FIGS. 3A to 3C are diagrams describing panorama photography. First, panorama photography will be described with reference to FIGS. 3A to 3C. FIG. 3A is a diagram schematically showing a photographing situation. FIG. 3B is a diagram showing a plurality of captured images. FIG. 3C is a diagram showing a panorama photography.

As shown in FIG. 3A, panorama photography is executed by a user performing continuous shooting while changing photographing directions by moving an image pickup apparatus 301 at an angular velocity ω [degrees/sec]. In FIG. 3B, photographing operations are performed such that captured images (refer to 302 to 304) include common regions of a subject. Here, it is possible to generate high-quality images with less image quality deterioration due to blur by correctly detecting and correcting background blur.

A process of correcting distortion of a photographing lens and further performing mapping to a virtual cylinder having the focal distance of the photographing lens as a diameter is performed for each image (refer to 302 to 304) shown in FIG. 3B. Then, feature points of common regions of the images are extracted and moving amounts of the feature points are detected as motion vectors. The motion vectors are transformed into affine transformation coefficients, for example, and a compositing process of superimposing the images 302 to 304 such that corresponding feature points coincide with each other is performed. In this manner, an image in which a part other than the common region has been extended is obtained. By performing these processes a plurality of times, an image with a wider photographing range than a single image, that is, a panorama photography 305 as shown in FIG. 3C, can be generated.

The configuration of the image pickup apparatus of the present embodiment will be described with reference to FIG. 1. The image pickup apparatus shown in FIG. 1 is an example of a lens interchangeable camera composited of an interchangeable lens 100 and a camera main body 131. The interchangeable lens 100 includes a photographing lens group 101. The photographing lens group 101 has a main imaging optical system 102, a zoom lens 103 and a shift lens 104. The zoom lens 103 is a movable optical member having a variable focal distance. The shift lens 104 is a correction lens which optically corrects image blur for an optical axis due to shake and the like with respect to the image pickup apparatus by moving in a direction perpendicular to the optical axis. A zoom encoder 106 detects the position of the zoom lens 103 and outputs a position detection signal to a lens control unit 112. A position detection sensor 105 detects the position of the shift lens 104 using a Hall element, for example, and outputs a position detection signal to the lens control unit 112 through an amplifier 114. Illustration of other optical members (a focus lens, a diaphragm, and the like) in the photographing lens group 101 is omitted.

The interchangeable lens 100 includes an angular velocity sensor 111 which detects shake. The angular velocity sensor 111 outputs an angular velocity signal to the lens control unit 112 as a shake detection signal. The lens control unit 112 includes a microcomputer for controlling a lens system and controls each component in the interchangeable lens 100. The interchangeable lens 100 includes a mount contact unit 115 connected to the camera main body 131. The lens control unit 112 can communicate with a camera control unit 142 which will be described later in a state in which the interchangeable lens 100 has been mounted in the camera main body 131.

A driver 113 drives the shift lens 104 according to a control command from the lens control unit 112. That is, the lens control unit 112 acquires position information from the amplifier 114 which amplifies the output of the position detection sensor 105 and calculates a driving target value of the shift lens 104. A control command signal representing the driving target value is output to the driver 113, and image blur correction is performed according to movement of the shift lens 104. The image pickup apparatus of the present embodiment includes an image blur correction device which drives an optical element (correction lens) in a direction perpendicular to the optical axis of the imaging optical system to correct image blur. The image blur correction device is not limited to this example, and there is an image blur correction device which corrects image blur according to control of movement of an imaging element. Further, an image blur correction device using control of movement of a correction lens and control of movement of an imaging element may be used.

The lens control unit 112 includes a shake correction control unit 121 and a background blur correction control unit 122. The shake correction control unit 121 performs image blur correction control of correcting image blur due to shake or the like of a user. The background blur correction control unit 122 controls correction of background blur during panorama photography. In the case of a mode in which panorama photography is indicated according to a user operation (hereinafter referred to as a panorama mode), the lens control unit 112 acquires data of a background angular velocity transmitted from the camera main body 131. The background blur correction control unit 122 controls a background blur correction operation on the basis of the background angular velocity. On the other hand, if the panorama mode is not selected, the shake correction control unit 121 acquires a shake detection signal through the angular velocity sensor 111 and controls a shake correction operation.

Although the lens control unit 112 also controls a focus lens, a diaphragm and the like, detailed description will be omitted for brevity of illustration. Further, for shake correction, although detection and correction are performed with respect to two axes perpendicular to each other, for example, the vertical direction and the horizontal direction, only detection and correction with respect to one axis will be described because detection and correction are performed in the same manner for the axes.

Next, the configuration of the camera main body 131 will be described. A reflex mirror 132 reflexes light from a subject such that the light penetrates a pentaprism 133 to be guided to a finder unit 134 while a release button of an operation unit 141 is pressed. When the release button is pressed, the reflex mirror 132 jumps and the light from the subject arrives at and is received by an imaging element 138. An automatic exposure (AE) sensor 135 detects light through the pentaprism 133 and outputs a light measurement signal to an analog signal processing circuit (AFE) 136a.

A shutter 137 is a mechanical shutter for controlling an exposure time. The imaging element 138 is a complementary metal oxide semiconductor (CMOS) image sensor or the like and photoelectrically converts an optical image of a subject to output an electrical signal. An analog signal processing circuit (AFE) 136b processes an analog signal output from the imaging element 138 and outputs the processed analog signal to a camera signal processing circuit 139.

The camera signal processing circuit 139 includes a motion vector detection unit 148 and a panorama signal processing circuit 149. The motion vector detection unit 148 acquires the output of the imaging element 138 through the analog signal processing circuit 136b and detects a motion vector of a captured image. The motion vector detection unit 148 detects a motion of an image of an N-th frame which is a reference and a motion of an image of an (N−1)-th frame in units of pixels as motion vectors of the images. The panorama signal processing circuit 149 generates data of a panorama photography from a plurality of images. The panorama signal processing circuit 149 includes a position alignment circuit which aligns positions of a plurality of continuously captured images, a geometric transformation circuit which performs cylindrical coordinate transformation or correction of distortion of a lens group, and a circuit for magnification of an image size. In addition, the panorama signal processing circuit 149 includes a trimming circuit which cuts a part of an image, a compositing circuit which composites a plurality of images, and the like. The operation of each circuit is known and thus detailed description is omitted.

A timing generator (TG) 140 sets an operation timing of the imaging element 138 and the analog signal processing circuits 136a and 136b according to a signal from the camera signal processing circuit 139.

The camera control unit 142 includes a microcomputer for camera system control and manages control of various operations. The camera control unit 142 includes a shutter control unit 150 and a background angular velocity calculation unit 151. The shutter control unit 150 outputs a control signal to a driver 143 and controls the operation of the shutter 137 according to driving control of a shutter driving motor 144. In addition, the background angular velocity calculation unit 151 calculates a background angular velocity for correcting background blur.

The operation unit 141 includes operation members such as a power switch and a release switch and transfers an operation instruction of a user to the camera control unit 142. A memory card 145 records captured image data and the like. A display unit 146 includes a display device such as a liquid crystal panel, monitors images according to image data from the camera signal processing circuit 139 and displays captured images on a screen.

The camera main body 131 includes a mount contact unit 147 connected to the interchangeable lens 100. The lens control unit 112 and the camera control unit 142 perform serial communication at a predetermined timing through the mount contact units 115 and 147. An angular velocity sensor 152 detects an angular velocity of shake of the camera main body 131 and outputs a detection signal to the camera control unit 142.

Next, the operation and function of the image pickup apparatus will be described. When a user performs a camera power ON operation through the operation unit 141, the camera control unit 142 detects the state change. The camera control unit 142 performs power supply to each circuit of the camera main body 131 and initial setting thereof. Power is supplied to the interchangeable lens 100 mounted in the camera main body 131, and the lens control unit 112 performs initial setting in the interchangeable lens 100. Then, communication is started between the lens control unit 112 and the camera control unit 142 at a predetermined timing. The camera control unit 142 transmits data such as a camera state and photographing settings to the lens control unit 112, and the lens control unit 112 transmits data such as a focal distance of a photographing lens and an angular velocity of shake to the camera control unit 142.

An shake correction function of the present embodiment will be described with reference to FIG. 2. The shake correction control unit 121 includes an offset removal unit 201 and a pulse width modulation unit 208. The same components as those in FIG. 1 are denoted by signs which have already been used and thus detailed description thereof is omitted.

The offset removal unit 201 is a filter calculation unit having a high pass filter (hereinafter abbreviated to HPF) or the like, for example, and removes a DC component included in the output of the angular velocity sensor 111. A gain phase calculation unit 202 includes an amplifier which amplifies an angular velocity signal from which an offset component has been removed by the offset removal unit 201 with a predetermined gain, and a phase compensation filter. A first integrator 203 has a function of capable of changing characteristics thereof in an arbitrary frequency band. The integrator 203 integrates the output of the gain phase calculation unit 202 and calculates a driving amount of the shift lens 104.

If an angular velocity detected by the angular velocity sensor 111 has a magnitude equal to or greater than a predetermined threshold value and a predetermined time has elapsed, the lens control unit 112 determines that panning (or tilting) is in process. In this case, a process of gradually changing the cutoff frequency of the HPF of the offset removal unit 201 to a high frequency is performed. According to this change, a target signal of shake correction control gradually decreases and thus the shift lens 104 can be returned to the center position of a movable range. For example, if an angular velocity that is large enough for it to be determined that panning is in process is detected, the shift lens 104 reaches a correction limiting point when image blur is corrected without changing the cutoff frequency of the HPF to a high frequency. Here, the cutoff frequency of the HPF is changed in order to prevent occurrence of a phenomenon in which unnatural changes in an angle of view are seen by a photographer in an image.

An image blur correction control determination unit (hereinafter referred to as a control determination unit) 204 acquires outputs of the first integrator 203 and a second integrator 225 and switches control signals for driving the shift lens 104 according to the output of a camera information acquisition unit 226. An integration value according to the second integrator 225 is employed if a photographing mode is a panorama mode and an integration value according to the first integrator 203 is employed if the photographing mode is a mode other than the panorama mode. The integrator 225 and the camera information acquisition unit 226 in the background blur correction control unit 122 will be described later.

The position detection sensor 105 detects the position of the shift lens 104, and the detection value amplified by the amplifier 114 is digitalized by an analog/digital (A/D) converter 206. A subtractor 205 subtracts the detection data digitalized by the A/D converter 206 from output data of the control determination unit 204. The subtractor 205 outputs deviation data obtained by subtraction to a controller 207. The controller 207 includes an amplifier which amplifies the deviation data from the subtractor 205 with a predetermined gain, and a phase compensation filter. The deviation data is subjected to signal processing performed by the amplifier and the phase compensation filter and then output to a pulse width modulation unit 208. The pulse width modulation unit 208 performs modulation into a PWM waveform for changing the duty ratio of pulse waves according to the output of the controller 207 and outputs a PWM signal to the driver 113 for driving the shift lens. The driver 113 includes a voice coil type motor and moves the shift lens 104 in a direction perpendicular to the optical axis of the imaging optical system according to the output of the pulse width modulation unit 208.

Here, methods of calculating a background angular velocity will be described. A first method is a method of calculating a background angular velocity using the output of the angular velocity sensor 111 in the interchangeable lens 100 or the output of the angular velocity sensor 152 in the camera main body 131. A second method is a method of calculating a background angular velocity using a motion vector obtained by the motion vector detection unit 148 in conjunction with the output signals of the angular velocity sensors.

Figure 4A:
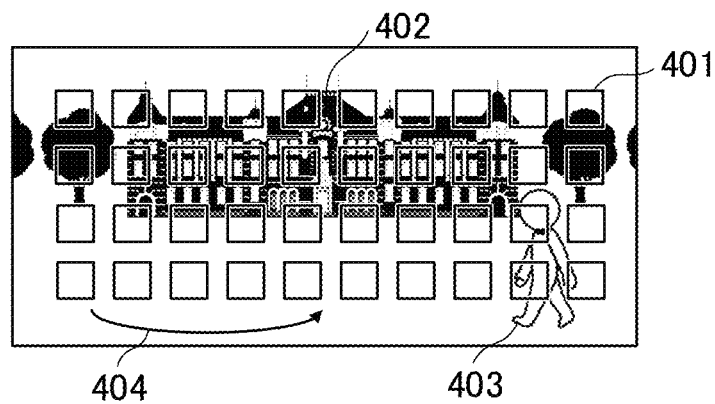
FIGS. 4A and 4B are diagrams describing background vector detection in an embodiment of the present invention.

The second method will be described first and then the first method will be described. In addition, proper use of the two methods will be described. FIG. 4A is a diagram describing a process performed by the motion vector detection unit 148 during panorama photography. In a circumstance in which a standstill subject 402 which is a main subject and a moving object 403 are present, a situation in which a photographer performs panning of a camera at a predetermined angular velocity in the horizontal direction of a screen as represented by an arrow 404 is assumed. The motion vector detection unit 148 divides an input image signal into a plurality of block regions 401 having appropriate sizes on the basis of a block matching method. A process of calculating differences of pixels in a certain range between a previous frame and a current frame in units of blocks and searching for a block region in the previous frame in which the sum of the absolute values of the differences is minimized is performed. Relative deviation between two compared images represents a motion vector of a block region.

Figure 4B:
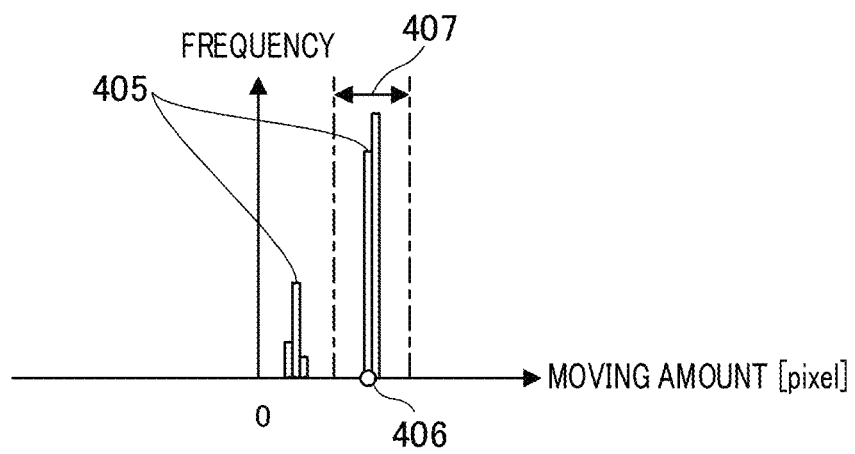

FIG. 4B shows a frequency distribution (histogram) of motion vectors detected by the motion vector detection unit 148. The horizontal axis represents a moving amount in units of pixels and the vertical axis represents the frequency of motion vectors. In the circumstance of FIG. 4A, two types of vectors corresponding to a moving amount of the moving object 403 and a moving amount associated with panning (refer to the arrow 404) are detected. At a time when a motion vector is detected, the motion vector detection unit 148 does not recognize whether the motion vector is a vector corresponding to a subject (moving object) region (subject vector) or a vector corresponding to a background region (background vector). Accordingly, a process for allowing a desired vector to be able to be extracted from all detected vectors 405 as shown in FIG. 4B is performed. The desired vector is a background vector because a main subject is a background in the case of the panorama mode. Clustering is performed using the output of the angular velocity sensor 152, for example, such that the background vector can be extracted. The average of angular velocity sensor outputs synchronized with a detection period (hereinafter referred to as an exposure centroid period) of the motion vector detection unit 148 is used as the output of the angular velocity sensor 152 used for clustering. This will be described in detail using FIG. 5.

Figure 5:
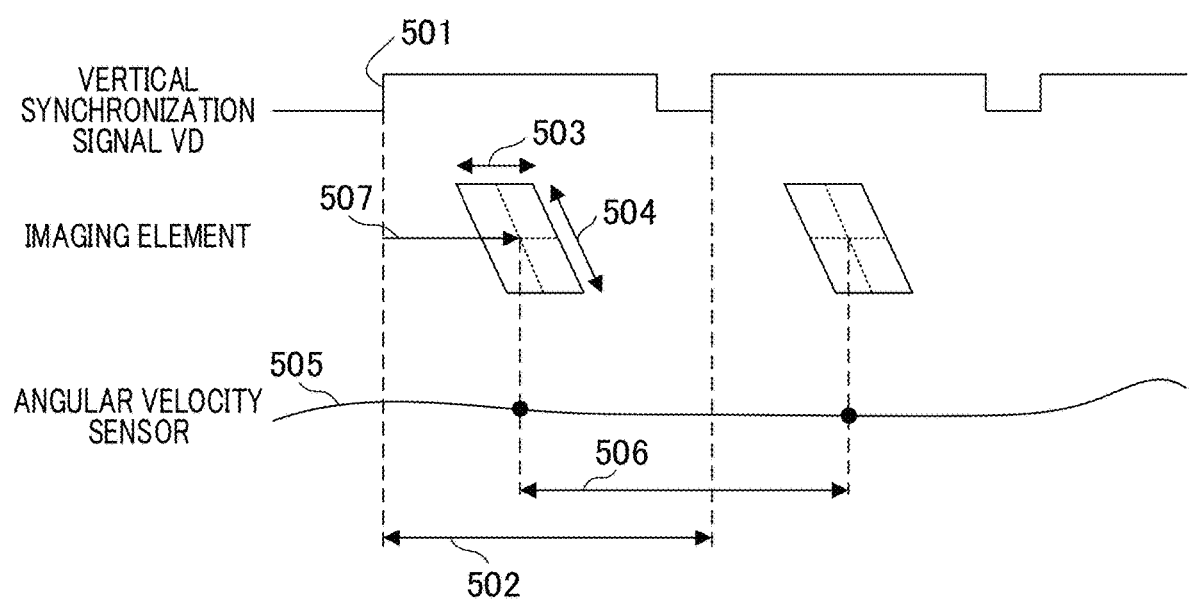
FIG. 5 is a diagram describing an angular velocity average in an exposure centroid period in an embodiment of the present invention.

FIG. 5 shows a vertical synchronization signal VD, the operation of the imaging element, and the output of the angular velocity sensor on a common time axis. The vertical synchronization signal VD is a signal for aligning frames, and a period 502 from the point in time of a leading edge 501 to the point in time of the next leading edge is one frame period. For example, if a frame rate is 60 frames per second (fps), the duration of one frame period is about 16.7 milliseconds (ms). Regarding the imaging element, an accumulation time 503 and a read time 504 are represented by an illustrated parallelogram. A period 507 is a period from the point in time of the leading edge 501 of the vertical synchronization signal VD to the point in time corresponding to the center of the illustrated parallelogram. An exposure centroid period 506 corresponds to a time interval between the centers of adjoining parallelograms. Regarding the angular velocity sensor, temporal changes in the output 505 thereof are represented. The average of angular velocities synchronized with the exposure centroid period 506 is employed. As the angular velocity sensor, the angular velocity sensor 111 in the interchangeable lens 100 or the angular velocity sensor 152 in the camera main body 131 is used. Alternatively, the two angular velocity sensors may be used together.

The background angular velocity calculation unit 151 converts the average of angular velocities in the exposure centroid period 506 into a moving amount on an imaging surface using information such as the focal distance, frame rate and pixel pitch of the imaging optical system. The moving amount on the imaging surface is represented as the moving amount 406 in FIG. 4B. When an angular velocity is converted into a moving amount on the imaging surface, an error may be generated due to a noise component of the angular velocity sensor, disturbance caused by shake of the reflex mirror 132 and the shutter 137, variations in the focal distance, variations in the frame rate, and the like. Accordingly, a process of setting a background range 407 shown in FIG. 4B using the converted moving amount on the imaging surface as the origin is performed. If the user performs panning at a specific angular velocity or higher, the background vector is separated from a position at which the moving amount is zero [pixel], and the moving amount on the imaging surface, that is, the moving amount 406, is placed near the position. Thus, clustering is performed using a vector in the background range 407 as the background vector and using a vector outside the background range 407 as a subject (moving object) vector. The background vector is converted into a background angular velocity through a method reverse to the method of converting an angular velocity into a moving amount on the imaging surface. In this manner, the background angular velocity calculation unit 151 calculates a background angular velocity from motion vectors. Meanwhile, although the method of using the output of the angular velocity sensor has been described as an example of clustering, clustering may be performed using distance information (depth information) within an angle of view.

Next, the first method of calculating a background angular velocity using only the detection output of the angular velocity sensor will be described. In the first method, the average of angular velocities in a certain period is used in order to mitigate the influence due to shake of the reflex mirror 132 and the shutter 137. For example, the certain period may be the average of angular velocities in the exposure centroid period 506, and a background angular velocity is calculated from the average. There are a method using the average for each exposure centroid period, a method using a movement average, a method using a weighted average obtained by weighting past averages, and the like.

Selection conditions in the case of proper use of the above-described first and second methods will be described. Although a background angular velocity obtained through the second method is selected by default in the present embodiment, a background angular velocity obtained through the first method is selected if detection reliability of the motion vector detection unit 148 is lower than a threshold value or a continuous shooting speed is less than a threshold value. This is because there is a possibility that shake of a mirror and a mechanical shutter will be detected and generation of an error in a detection output will be a concern when a background angular velocity is calculated using only the first method. Further, if very slow panning is performed, a noise component in an angular velocity sensor output is not distinguished from a detection component caused by shake and thus it is difficult to detect a correct angular velocity.

On the other hand, in the second method, it is necessary to represent piece interval frames in order to acquire images for detecting motion vectors between previous photographing and current photographing. As the number of piece interval frames increases, the continuous shooting speed decreases because it is necessary to wait for an exposure start timing until next photographing. For example, if the frame rate is 60 [fps], a processing time of approximately at least 33 [ms] is taken to detect a motion vector. Accordingly, a continuous shooting speed decrease during panorama photography is a concern. As an example, a case in which a shutter speed based on a program diagram is 1/250 [s] in panorama photography performed outdoors in clear weather such as EV13 is assumed. When a processing time for detecting a motion vector is required between continuous shooting operations, a waiting time until next photographing is generated and thus the continuous shooting speed decreases. That is, a continuous shooting speed decrease refers to an increase in a moving amount on the imaging surface in one frame. In such a case, when edges of superimposed regions of a plurality of images are detected and composited in an image compositing procedure, the number of superimposed regions of the plurality of images decreases and thus a compositing success rate decreases. Accordingly, in the present embodiment, the first method is employed depending on a condition determination result that the continuous shooting speed is less than a threshold value.

The configuration of the background blur correction control unit 122 will be described with reference to FIG. 2. A communication control unit 211 transmits information to the camera control unit 142 through the mount contact unit 115 and receives information necessary for control from the camera control unit 142. An angular velocity output unit 222 acquires an angular velocity detection signal from which an offset component has been removed by the offset removal unit 201. The angular velocity output unit 222 outputs the angular velocity detection signal to the camera control unit 142 through the communication control unit 211.

A background angular velocity acquisition unit 223 acquires data of background angular velocities calculated by the background angular velocity calculation unit 151 from the communication control unit 211 and outputs the data to a subtractor 224. The subtractor 224 subtracts the output of the background angular velocity acquisition unit 223 from the output of the offset removal unit 201 and outputs difference data to the integrator 225. The integrator 225 integrates angular velocities represented by the difference data to calculate an angle and outputs angle data to the control determination unit 204 in the shake correction control unit 121.

The camera information acquisition unit 226 acquires information necessary for control through the communication control unit 211 and outputs the information to the control determination unit 204. The necessary information is information such as a photographing mode, a photographing instruction, an exposure timing, and an exposure time. The control determination unit 204 determines whether the current photographing mode is a panorama mode on the basis of the information acquired from the camera information acquisition unit 226. If the photographing mode is the panorama mode, the control determination unit 204 employs an integration value according to the integrator 225. In this manner, image blur correction based on the background angular velocity is performed.

Figure 6:
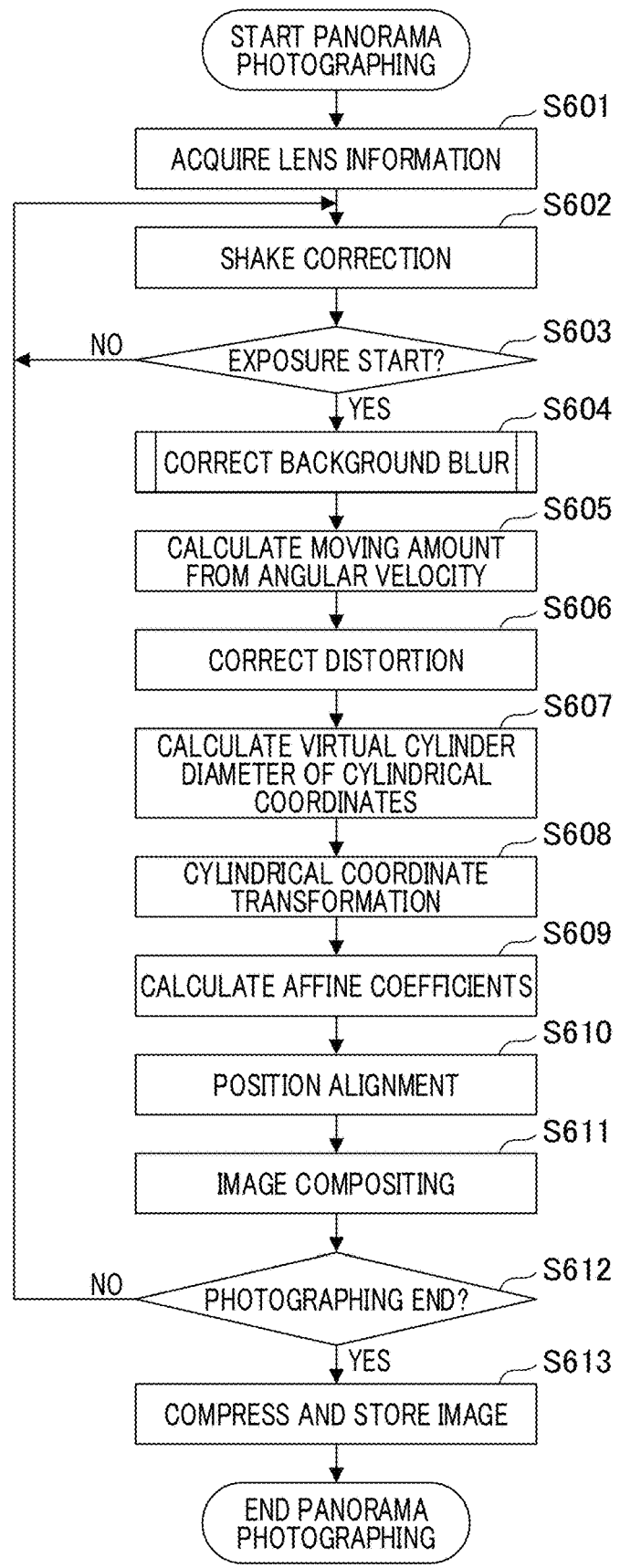
FIG. 6 is a flowchart illustrating panorama photography in an embodiment of the present invention.
Figure 7:
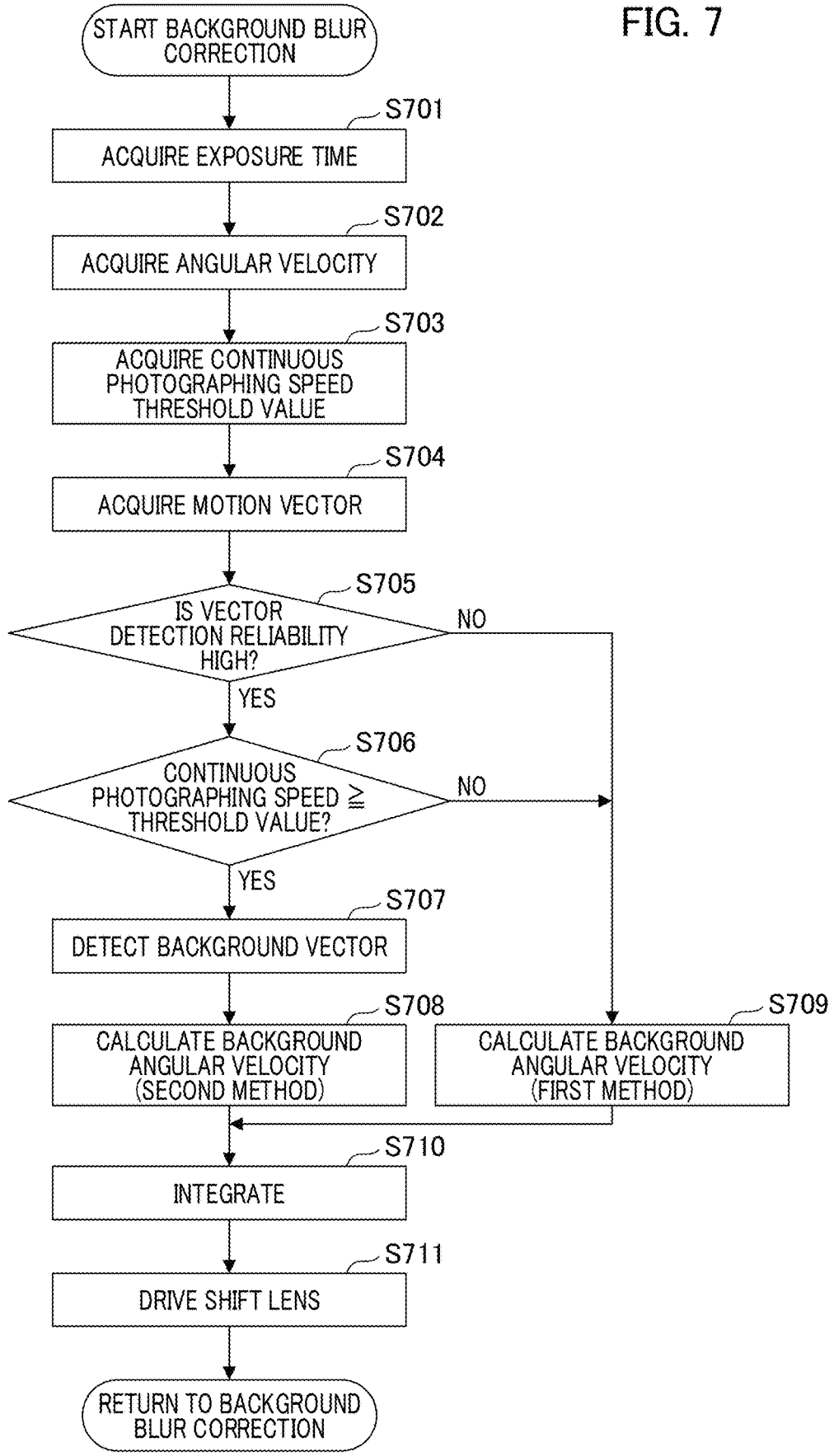
FIG. 7 is a flowchart illustrating background blur correction in a first embodiment.

An imaging operation will be described with reference to the flowcharts of FIGS. 6 and 7. FIG. 6 is a flowchart describing the overall process in the panorama mode. FIG. 7 is a flowchart describing background blur correction in the panorama mode. First, the process of FIG. 6 will be described.

(S601) Lens Information Acquisition

The camera control unit 142 acquires lens information from the lens control unit 112. The lens information is information such as a focal distance and a diaphragm value and is used for distortion correction, cylindrical coordinate transformation and the like.

(S602) Shake Correction

The shake correction control unit 121 performs shake correction control before exposure starts in the panorama mode. The motion vector detection unit 148 detects motion vectors of captured images before exposure starts concurrently with the control.

(S603) Exposure Start Determination

The camera control unit 142 performs an exposure start determination process. If exposure starts, the process proceeds to the process of S604. Before exposure starts, the process returns to S602 and the shake correction continues.

(S604) Background Blur Correction

The camera control unit 142 performs switching to background blur correction control. This will be described in detail later using the flowchart of FIG. 7.

(S605) Calculation of Moving Amount on Imaging Surface From Angular Velocity

The camera control unit 142 performs a process of converting acquired shake angular velocities into a moving amount [pixel] on the imaging surface in units of pixel using information such as the frame rate, focal distance and pixel pitch of the imaging element.

(S606) Distortion Correction

The panorama signal processing circuit 149 performs lens distortion correction for a developed image using a geometric transformation circuit.

(S607) Calculation of Virtual Cylinder Diameter of Cylindrical Coordinates

The panorama signal processing circuit 149 or the camera control unit 142 calculates a virtual cylinder diameter for performing cylindrical coordinate transformation using the focal distance and the moving amount on the imaging surface.

(S608) Cylindrical Coordinate Transformation

The panorama signal processing circuit 149 performs cylindrical coordinate transformation using the virtual cylinder diameter calculated in S607.

(S609) Affine Coefficient Calculation

The panorama signal processing circuit 149 calculates affine coefficients. For example, three different feature points 1 to 3 are detected using motion vectors. The coordinates of feature point 1 are represented by (x1, y1), the coordinates of feature point 2 are represented by (x2, y2) and the coordinates of feature point 3 are represented by (x3, y3). A case in which feature point 1 moves from the coordinates (x1, y1) to coordinates (u1, v1), feature point 2 moves from the coordinates (x2, y2) to coordinates (u2, v2) and feature point 3 moves from the coordinates (x3, y3) to coordinates (u3, v3) is assumed. In this case, simultaneous equations (1) and (2) are established.

$$\begin{pmatrix} x1 & y1 & 1 \\ x2 & y2 & 1 \\ x3 & y3 & 1 \end{pmatrix} \begin{pmatrix} a \\ b \\ c \end{pmatrix} = \begin{pmatrix} u1 \\ u2 \\ u3 \end{pmatrix} \qquad (1)$$

$$\begin{pmatrix} x1 & y1 & 1 \\ x2 & y2 & 1 \\ x3 & y3 & 1 \end{pmatrix} \begin{pmatrix} d \\ e \\ f \end{pmatrix} = \begin{pmatrix} v1 \\ v2 \\ v3 \end{pmatrix} \qquad (2)$$

It is possible to calculate affine coefficients a to f by solving the simultaneous equations. If four or more feature points are detected, feature points close to each other may be excluded and normalization may be performed using the least-squares method.

(S610) Position Alignment

The position alignment circuit in the panorama signal processing circuit 149 performs position alignment of a plurality of captured images on the basis of the affine coefficients calculated in S609.

(S611) Image Compositing (Image Combining)

The compositing circuit in the panorama signal processing circuit 149 aligns the positions of an (N−1)-th image and an N-th image and then composites the images. Meanwhile, if the N-th (N>2) image is processed, a process of compositing the composite result so far and the N-th image after the aligned position is performed. If a captured image includes a moving object region, a process of changing a composite ratio at the boundary of the captured image is performed in order to prevent deterioration of quality of a composite result.

(S612) Determination of End of Photographing

If the camera control unit 142 determines that the photographing operation continues, the camera control unit 142 returns to S602 and performs the subsequent process. In addition, if the camera control unit 142 determines that the photographing operation ends, the camera control unit 142 proceeds to S613.

(S613) Image Compression and Storage

The camera control unit 142 performs control of compressing developed image data into data in a general-purpose format such as Joint Photographic Experts Group (JPEG) format and storing the image data in an external memory (recording medium).

Next, background blur correction control will be described with reference to FIG. 7.

(S701) Exposure Time Acquisition

The camera control unit 142 acquires an exposure time on the basis of a program diagram.

(S702) Angular Velocity Acquisition

The camera control unit 142 acquires angular velocities detected by the angular velocity sensor 111 or 152.

(S703) Continuous Shooting Speed Threshold Value Acquisition

The camera control unit 142 acquires a continuous shooting speed threshold value (e.g., 5 [per second]) of bounds in which position alignment and compositing of images can be performed in a procedure of generating a panorama photography.

(S704) Motion Vector Acquisition

The camera control unit 142 acquires motion vectors of images detected by the motion vector detection unit 148.

(S705) Determination of Motion Vector Detection Reliability

The camera control unit 142 determines detection reliability of motion vectors acquired in S704. Motion vector detection reliability represents probability of detection performed by the motion vector detection unit 148. In a low luminance environment such as EV3, for example, detection reliability decreases in a low contrast case, a case in which there is no characteristic shape such as a white wall belonging to one surface, and the like. The process proceeds to S706 if detection reliability is equal to or higher than a threshold value and proceeds to S709 if detection reliability is less than the threshold value.

(S706) Comparison of Continuous Shooting Speed With Threshold Value

The camera control unit 142 determines whether the continuous shooting speed can be set to be equal to or greater than the continuous shooting speed (speed of continuous shooting) threshold value acquired in S703 in the case of the second method which uses motion vectors. The process proceeds to S707 if the continuous shooting speed can be set to be equal to or greater than the threshold value and proceeds to S709 if the continuous shooting speed cannot be set to be equal to or greater than the threshold value.

(S707) Background Vector Detection

The background angular velocity calculation unit 151 performs clustering using the angular velocities acquired in S702 and the motion vectors acquired in S704 and performs a process of extracting a background vector from all motion vectors. Then, the process proceeds to S708.

(S708) Background Angular Velocity Calculation (Second Method)

The background angular velocity calculation unit 151 calculates a background angular velocity by converting the background vector detected in S707 from a pixel unit to an angular velocity unit using information of the focal distance, the frame rate and the pixel pitch of the imaging element.

(S709) Background Angular Velocity Calculation (First Method)

The background angular velocity calculation unit 151 calculates the background angular velocity using only the output of the angular velocity sensor acquired in S702 if motion vector detection accuracy is not sufficient and detection reliability is low in S705 or the continuous shooting speed cannot be set to be equal to or greater than the threshold value in S706.

(S710) Integration

The background angular velocity acquisition unit 223 acquires the background angular velocity calculated in S708 or S709. The integrator 225 in the background blur correction control unit 122 integrates the output of the subtractor 224 and the control determination unit 204 employs the integration value of the integrator 225. In this manner, a background blur correction amount which is a command value of an image blur correction system including the shift lens 104 is calculated.

(S711) Shift Lens Driving

The lens control unit 112 outputs a control signal to the driver 113 on the basis of the background blur correction amount calculated in S710 and drives the shift lens 104 to correct background blur.

In the present embodiment, it is possible to acquire a clear panorama photography with controlled background blur by correctly detecting a background angular velocity and correcting image blur in panorama photography.

Second Embodiment

Next, a second embodiment of the present invention will be described. In the present embodiment, description of the same matters as those in the first embodiment will be omitted and differences from the first embodiments will be mainly described. In the present embodiment, a background angular velocity obtained using a motion vector is selected to perform image blur correction. Since it is difficult to be affected by shake caused by operations of driving mechanisms such as a mirror and a mechanical shutter, a background blur amount can be detected more accurately. The image pickup apparatus calculates background angular velocities from background vectors corresponding to background regions detected from respective frames and determines a background velocity using the least-squares method. Here, the continuous shooting speed may decrease depending on the number or piece interval frames between photographing operations following the second photographing in continuous shooting. As the continuous shooting speed decreases, decrease in position alignment and compositing accuracy of a panorama photography is concerned.

Distinguished from panning of photographing a moving object while following the moving object with a camera, a standstill subject (e.g., a landscape, a standstill building, or the like) is a main imaging target in panorama photography and thus a user easily performs panning or tilting with stability. In the present embodiment, control of monitoring a background angular velocity calculated for each frame and changing the number of piece interval frames of the second and following photographing operations in continuous shooting in response to a degree of stability of background angular velocities is performed.

Figure 8:
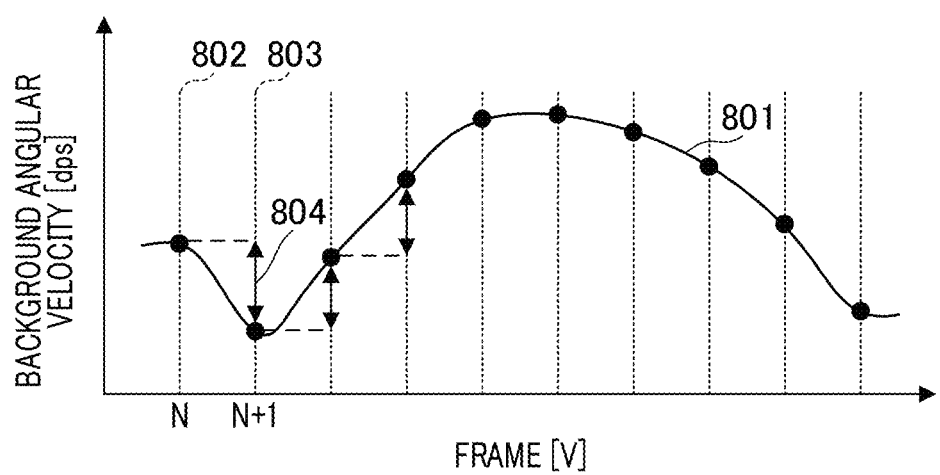
FIG. 8 is a diagram describing stability of a background angular velocity in a second embodiment.

Stability of a background angular velocity will be described with reference to FIG. 8. The horizontal axis represents frames and the vertical axis represents background angular velocity in dps (degree per second). A graph curve 801 represents changes in background angular velocities detected for each frame. When a certain frame is denoted by N, a frame N 802 and the following frame N+1 803 are illustrated. The camera control unit 142 calculates a difference 804 between a background angular velocity in the frame N 802 and a background angular velocity in the frame N+1 803 and compares the difference value with a threshold value. The threshold value has a magnitude of about 3 dps, for example. The camera control unit 142 determines that the background angular velocities are stable if the magnitude of the difference 804 is less than the threshold value and determines that the background angular velocities are instable if the difference 804 is equal to or greater than the threshold value.

Figure 9:
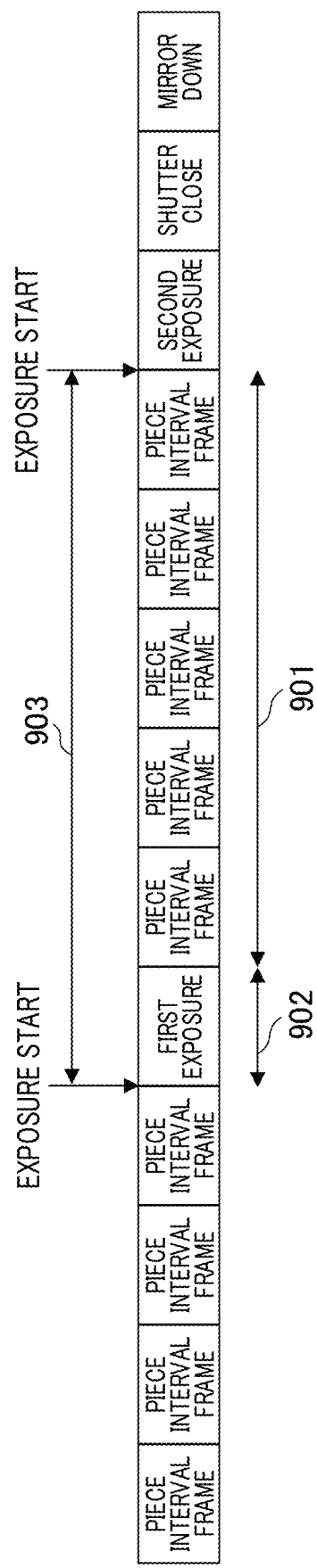
FIG. 9 is a diagram describing a sequence during continuous shooting in the second embodiment.

Control of changing the number of piece interval frames after the second and following photographing operations in continuous shooting on the basis of a degree of stability of background angular velocities will be described with reference to FIG. 9. In the present embodiment, a process of changing the number of times a motion vector being detected in a case in which changes in a background blur amount are less than a threshold value in continuous imaging is performed. FIG. 9 schematically shows periods of piece interval frames, exposure, a closing operation of the shutter 137 and a mirror down operation of the reflex mirror 132. The number of piece interval frames corresponds to the number of times a motion vector being detected. A period from a first exposure start time to a second exposure start time is represented as a period 903. In the period 903, a first exposure period 902 and a period 901 of a plurality of piece interval frames are represented.

The camera control unit 142 sets the total number of piece interval frames (refer to the period 901) to a predetermined number (e.g., 5 pieces) if the camera control unit 142 determines that background angular velocity stability is not sufficient and sets the number of piece interval frames to a value smaller than the predetermined value if the camera control unit 142 determines that there is background angular velocity stability. In a state in which background angular velocities are instable, a photographer performs a panning or tilting operation rapidly or slowly. In this case, it is necessary to increase the number of samples used for the least-squares method in order to correctly calculate a background blur amount to be corrected during exposure. The camera control unit 142 determines the number of piece interval frames from the following information.

The duration of the first exposure period 902 (exposure time)

A frame rate corresponding to a motion vector detection period

A continuous shooting speed corresponding to the period 903 based on a continuous shooting setting sequence For example, if background angular velocities are stable and the exposure time is $1/250$ [s], the total number of piece interval frames is set to 2 pieces. In the case of a frame rate of 60 [fps], the sequence is shortened by about 50 [ms] and thus the continuous shooting speed can be increased.

Figure 10:
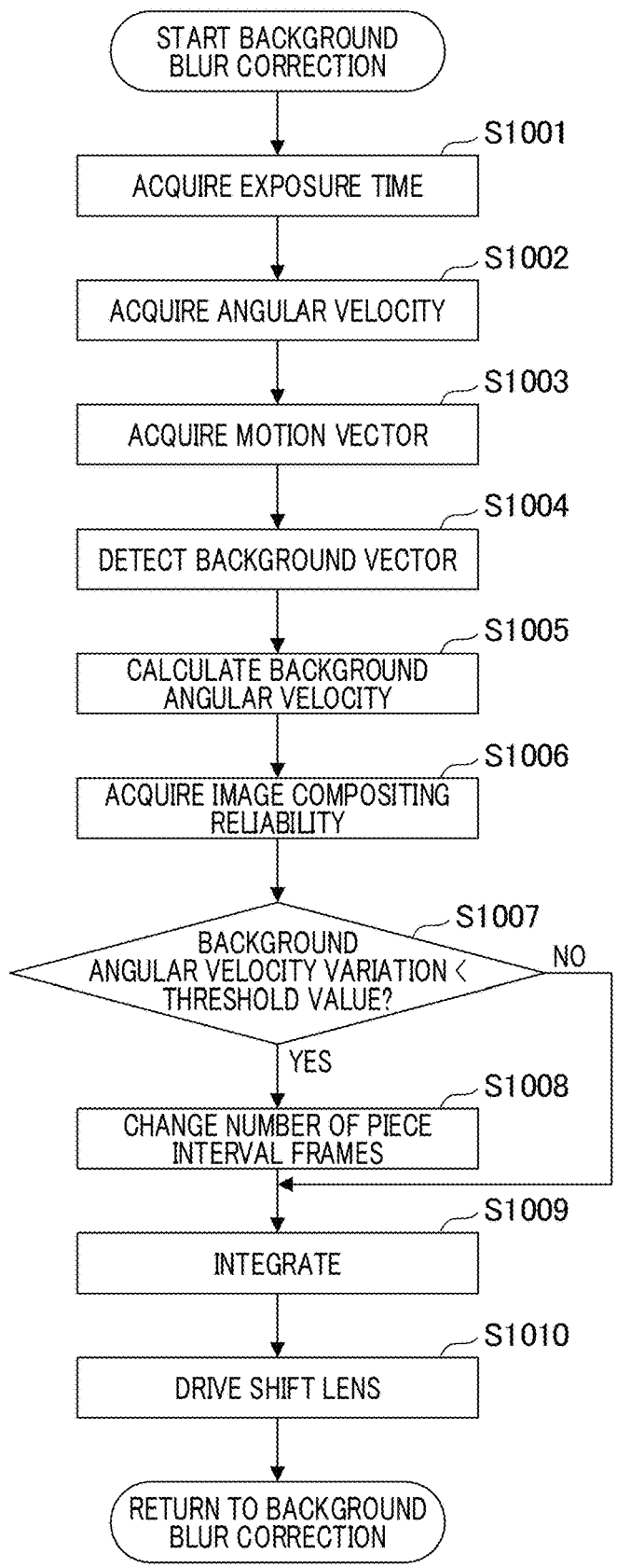
FIG. 10 is a flowchart illustrating the background blur correction in the second embodiment.

Background blur correction control of the present embodiment will be described with reference to the flowchart of FIG. 10. Processes of S1001 and S1002 are the same as the processes of S701 and S702 of FIG. 7. In S1003, a motion vector of a captured image detected by the motion vector detection unit 148 is acquired.

In S1004, a process of performing clustering using angular velocities acquired in S1002 and motion vectors acquire din S1003 to extract background vectors from all detected motion vectors is performed. In S1005, the background vectors extracted in S1004 are converted from a pixel unit to an angular velocity unit to calculate background angular velocities using information of the focal distance, the frame rate and the pixel pitch of the imaging element. Then, processes of S1006 to S1010 described below are performed.

(S1006) Image Compositing Reliability Acquisition

The camera control unit 142 acquires position alignment and compositing reliability of images in a procedure of generating a panorama photography. The reliability represents whether position alignment and compositing of images are successful during exposure. The reliability is calculated on the basis of the angular velocities acquired in S1002 or the background angular velocities calculated in S1005 and motion vector detection reliability detected in S1003. For example, if shake of the image pickup apparatus is equal to or greater than a motion vector detection maximum value, that is, if detection values of angular velocities are equal to or greater than a predetermined threshold value, there is a possibility of position alignment accuracy of images being insufficient. In this case, the reliability decreases.

(S1007) Determination of Threshold Value of Background Angular Velocity Variation Amount The camera control unit 142 monitors the background angular velocities calculated in S1005 for each frame and determines whether the magnitude of a difference (variation amount) between a current background angular velocity value and a previous background angular velocity value is less than a threshold value. If the magnitude of the difference between the background angular velocities is less than the threshold value, it is determined that a photographer performs panning or tilting with stability and the process proceeds to S1008. In addition, if the magnitude of the difference between the background angular velocities is equal to or greater than the threshold value, it is determined that stabilized panning or tilting is not performed and the process proceeds to S1009.

(S1008) Change of Number of Piece Interval Frames

The camera control unit 142 performs a process of reducing the number of piece interval frames after the second and following photographing operations during continuous shooting. That is, the number of times a motion vector being detected is reduced to below the number of times in a case in which the magnitude of the difference between background angular velocities is equal to or greater than the threshold value.

(S1009) Integration

The background angular velocity acquisition unit 223 acquires the background angular velocities calculated in S1005 and the control determination unit 204 employs an integration value of the integrator 225. A background blur correction amount which is a command value of the image blur correction system is calculated.

(S1010) Shift Lens Driving

The lens control unit 112 drives the shift lens 104 on the basis of the background blur correction amount calculated in S1009 to correct background blur.

According to the present embodiment, it is possible to detect background blur with high accuracy while maintaining a continuous shooting speed and correct image blur, improving the image quality of a panorama image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-4221, filed Jan. 15, 2018 which is hereby incorporated by reference wherein in its entirety.

What is claimed is:

1. An image pickup apparatus capable of combining a plurality of continuously captured images, comprising:
at least one processor and at least one memory functioning as:
a first detection unit configured to detect shake of the image pickup apparatus;
a second detection unit configured to detect a moving amount of a captured image captured by an imaging unit;
a correction unit configured to correct image blur of an image caused by shake of the image pickup apparatus;
a control unit configured to calculate a blur amount of a target in the captured image from a shake detection signal detected by the first detection unit and the moving amount detected by the second detection unit and to control image blur correction performed by the correction unit; and
a combining unit configured to combine a plurality of captured images with corrected image blur,
wherein the control unit switches first control of controlling the correction unit using a correction amount calculated from the shake detection signal and second control of controlling the correction unit using a correction amount calculated from the shake detection signal and the moving amount, depending on detection reliability of the moving amount or a continuous shooting speed.

2. The image pickup apparatus according to claim 1, wherein, in the first control, the control unit calculates the blur amount of the target using the average of the shake detection signal detected by the first detection unit in synchronization with a detection period of the second detection unit.

3. The image pickup apparatus according to claim 1, wherein, in the second control, the control unit calculates the blur amount of the target using the average of the shake detection signal detected by the first detection unit in synchronization with a detection period of the second detection unit and the moving amount detected by the second detection unit.

4. The image pickup apparatus according to claim 3, wherein the second detection unit detects motion vectors from data of a plurality of captured images, and
wherein the control unit performs a process of extracting a target vector corresponding to a target region in the captured images from the plurality of motion vectors.

5. The image pickup apparatus according to claim 1, wherein the control unit performs the first control if the detection reliability of the moving amount is lower than a threshold value and performs the second control if the detection reliability of the moving amount is equal to or greater than the threshold value.

6. The image pickup apparatus according to claim 1, wherein the control unit performs the first control if the continuous shooting speed is less than a threshold value and performs the second control if the continuous shooting speed is equal to or greater than the threshold value.

7. The image pickup apparatus according to claim 1, wherein the control unit changes the number of detection times when the second detection unit detects the moving amount if changes in the blur amount of the target are less than a threshold value in continuous imaging.

8. The image pickup apparatus according to claim 7, wherein the control unit decreases the number of detection times when the second detection unit detects the moving amount in the second and subsequent imaging and following imaging to below the number of times the second detection unit detects a moving amount in first imaging.

9. The image pickup apparatus according to claim 7, wherein the control unit sets the number of times the number of detection times of the moving amount as a first number of detection times if the magnitude of a difference between a detected previous blur amount of the target and a current blur amount of the target is equal to or greater than a threshold value and sets the number of times the moving amount is detected to a second number of times of detection less than the first number of times of detection if the magnitude of the difference is less than the threshold value.

10. The image pickup apparatus according to claim 7, wherein the control unit determines the number of times the moving amount is detected using a frame rate corresponding to the detection period of the second detection unit, an exposure time and a continuous shooting speed of the imaging unit.

11. The image pickup apparatus according to claim 1, wherein the blur amount of the target is a blur amount of a background.

12. A control method performed in an image pickup apparatus capable of combining a plurality of continuously captured images, comprising:
detecting, by a first detection unit, shake of the image pickup apparatus and detecting, by a second detection unit, a moving amount of a captured image captured by the image pickup apparatus;
correcting image blur of an image caused by shake of the image pickup apparatus by calculating a blur amount of a target in the captured image from a shake detection signal detected by the first detection unit and the moving amount detected by the second detection unit and controlling a correction unit;

combining a plurality of captured images with corrected image blur; and switching first control of controlling the correction unit using a correction amount calculated from the shake detection signal and second control of controlling the correction unit using a correction amount calculated from the shake detection signal and the moving amount, depending on detection reliability of the moving amount or a continuous shooting speed.

* * * * *